(No Model.) 4 Sheets—Sheet 1.

C. F. DANIELS.
FIELD MAGNET FOR ELECTRIC MOTORS OR DYNAMOS.

No. 489,071. Patented Jan. 3, 1893.

Witnesses
Henry D. Williams
Thomas Foley

Inventor
Cornelius F. Daniels
By his Attorneys
Witter & Kenyon (No Model.) 4 Sheets—Sheet 2.

C. F. DANIELS.
FIELD MAGNET FOR ELECTRIC MOTORS OR DYNAMOS.

No. 489,071. Patented Jan. 3, 1893.

Witnesses
Henry D. Williams
Thomas Foley

Inventor
Cornelius F. Daniels
By his Attorneys
Witter & Kenyon

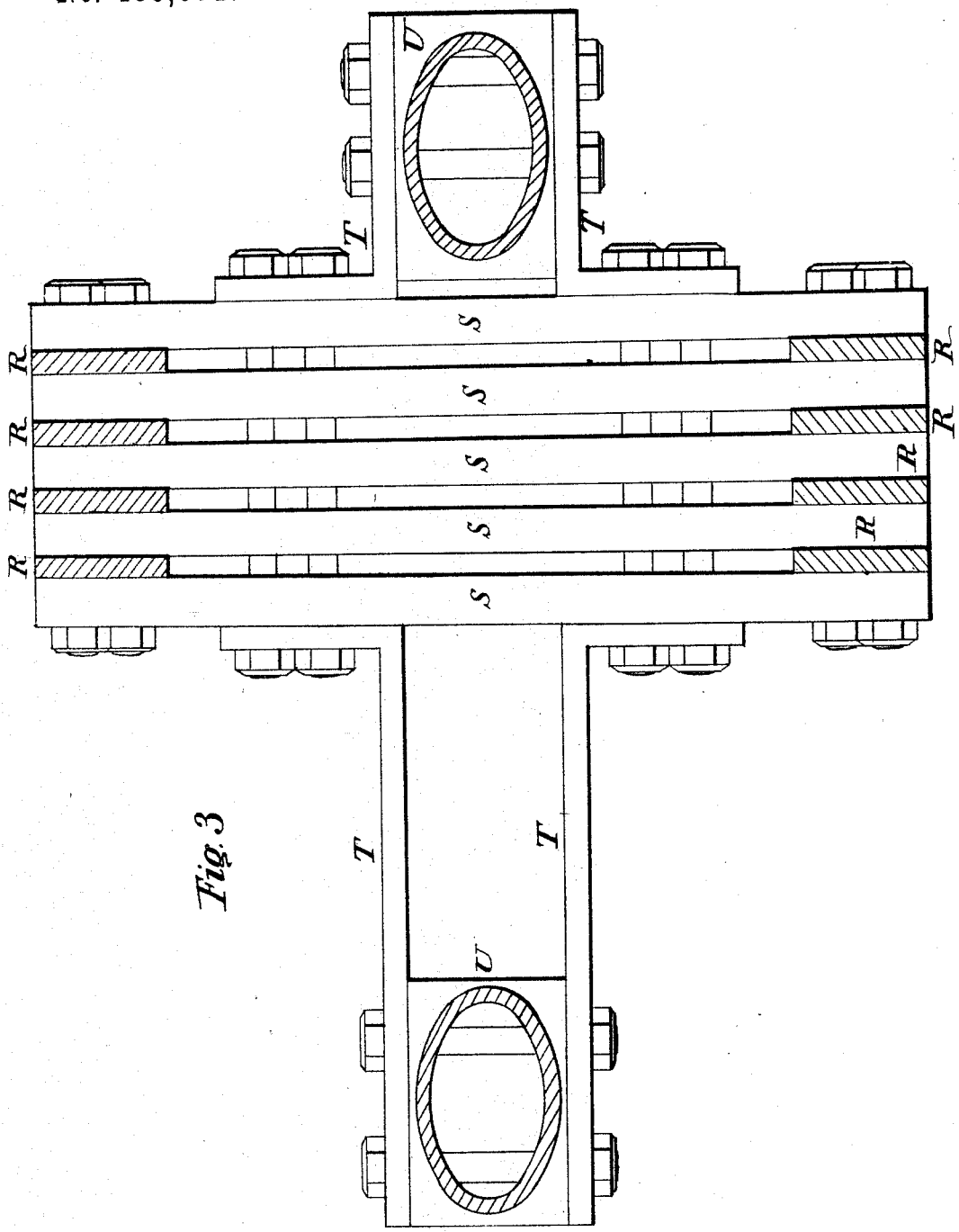

(No Model.) 4 Sheets—Sheet 4.
C. F. DANIELS.
FIELD MAGNET FOR ELECTRIC MOTORS OR DYNAMOS.
No. 489,071. Patented Jan. 3, 1893.
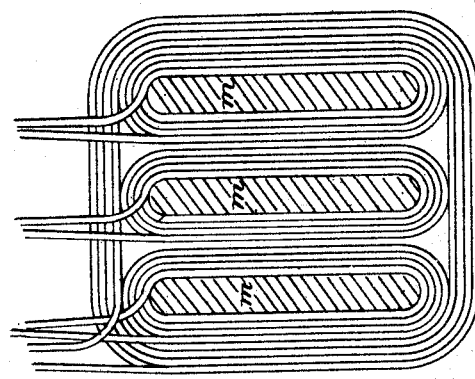
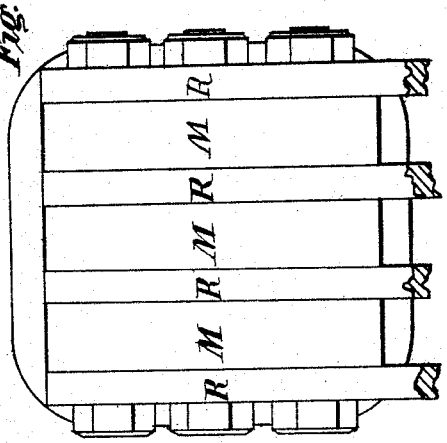
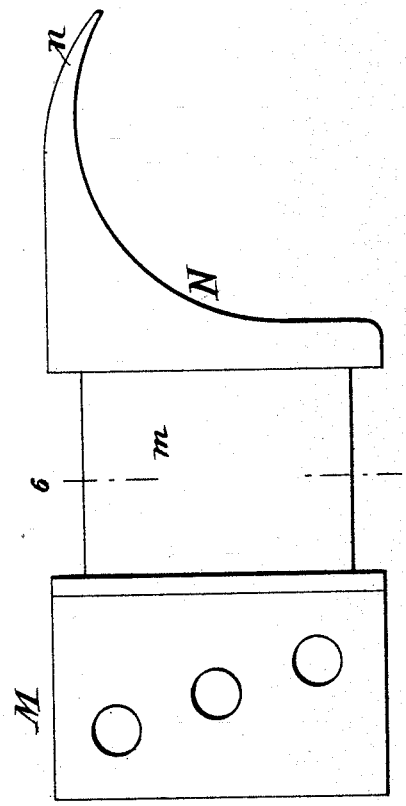
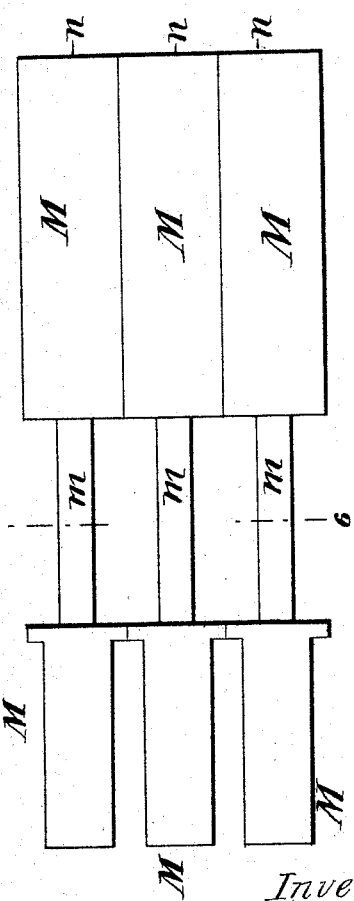
Witnesses
Henry D. Williams
Thomas Foley
Inventor
Cornelius F. Daniels
By his Attorneys
Witter & Kenyon

UNITED STATES PATENT OFFICE.

CORNELIUS F. DANIELS, OF MACON, GEORGIA.

FIELD-MAGNET FOR ELECTRIC MOTORS OR DYNAMOS.

SPECIFICATION forming part of Letters Patent No. 489,071, dated January 3, 1893.

Application filed December 2, 1891. Serial No. 413,839. (No model.)

*To all whom it may concern:*

Be it known that I, CORNELIUS F. DANIELS, a citizen of the United States, residing at Macon, in the county of Bibb and State of Georgia, have invented certain new and useful Improvements in Field-Magnets for Electric Motors or Dynamos, of which the following is a full, clear, and exact specification, reference being had to the accompanying drawings, forming part hereof.

The object of my invention is to produce improved field magnets and their supports and framework for electric motors or dynamos of increased power and efficiency, and it consists in the improved mechanism hereinafter described and claimed.

Figure 1:
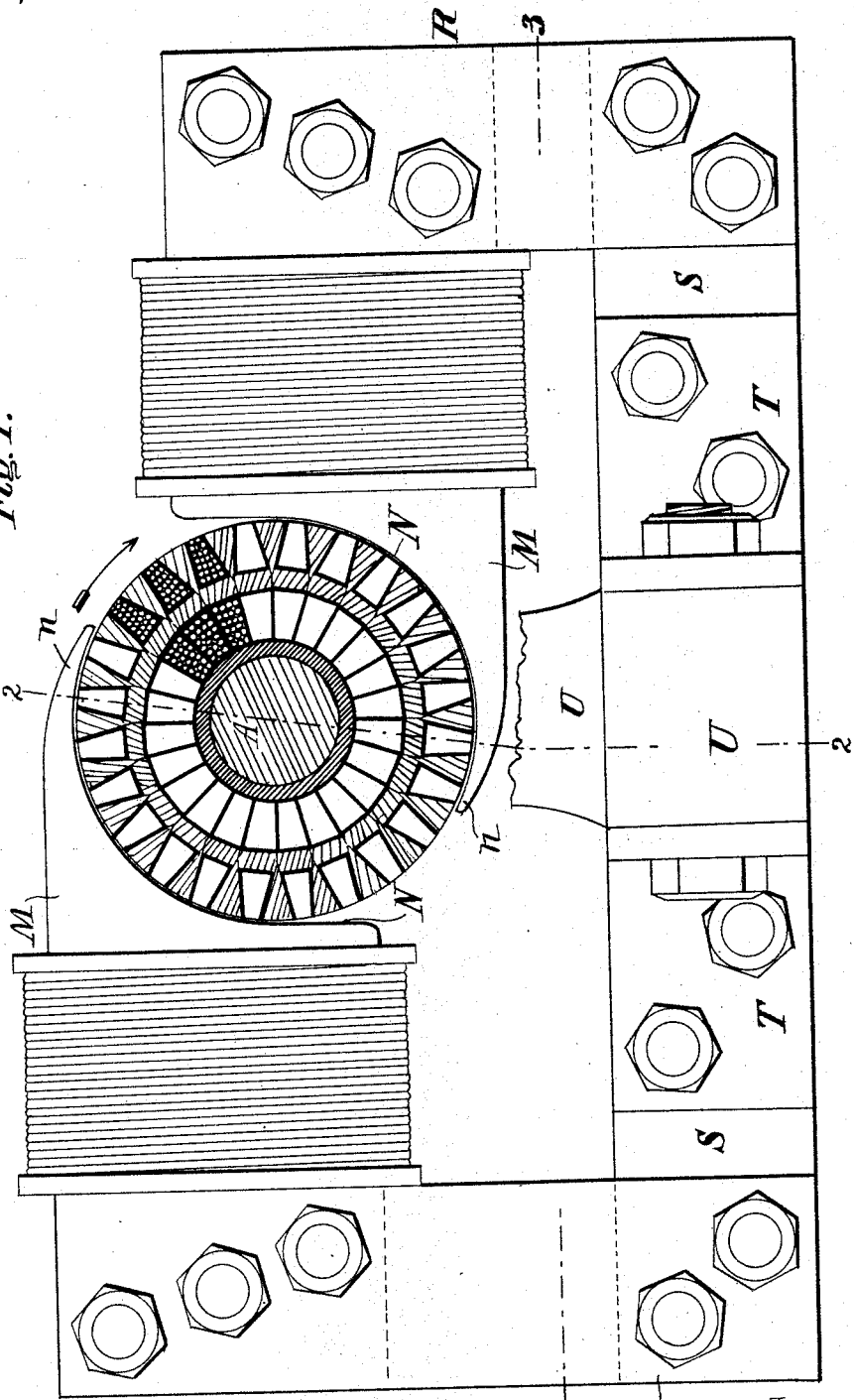
Figure 2:
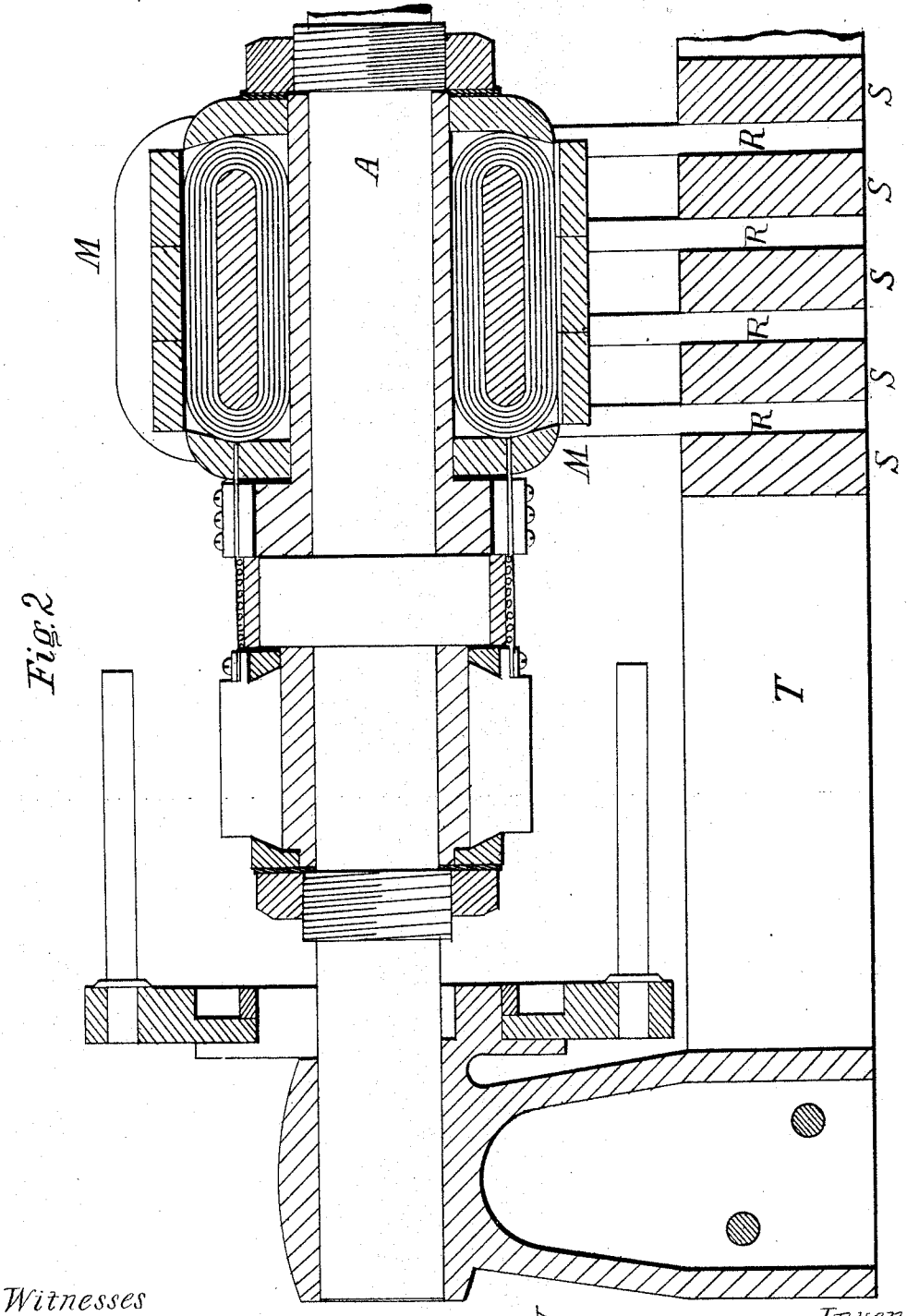

Figure 1 represents a side elevation of the field magnets and their supports and connecting framework and armature, the armature being shown in section. Fig. 2 is a vertical section of the same taken on the line 2—2, Fig. 1. Fig. 3 is a horizontal section of the same on the line 3—3, Fig. 1. Fig. 4 is a detached side elevation and Fig. 5 a detached plan view of the pieces of iron forming the cores and field pieces of one of the field magnets. Fig. 6 is a vertical section of the same on the line 6—6, Figs. 4 and 5, also showing the coils of wire wound about the cores. Fig. 7 is a detached end elevation of the same.

My invention is preferably intended to be used in connection with the other parts of a complete electric motor or dynamo invented by me, applications for patents for which are made by me simultaneously herewith, the same bearing Serial Nos. 413,837, 413,838 and 413,840 respectively. My invention may, however, as is evident, be used with other armatures and parts of electric motors or dynamos.

My improved field magnet is made up of more than one piece of iron, preferably a number of pieces bolted or fastened together, each piece being wound separately with wire. These pieces together constitute the field magnet. In the drawings I have shown each magnet made up of three pieces, M, M, M. About the center of each piece M it is cut away on both sides and at the top and bottom, as clearly shown in Figs. 4 and 5; the said center portion marked $m$ forms a core around which wire is wound as shown in Fig. 6. Each piece M has at the operative field end of the magnet a curved portion N, which terminates in a curved projecting finger end $n$ forming one pole of the field magnet. This curved portion N is hollowed or curved so that the armature will fit snugly into it, except that toward the lower part and a short distance before the lower end of N is reached, this curved face departs slightly and gradually from the curve of the armature surface. In the drawings it is represented as a straight line for a short distance from the lower end of the curved portion. The cores $m$ of the separate pieces M are each separately wound with wire and the pieces are bolted or otherwise fastened together. Then preferably another wire is wound around the outside of all the cores as shown in Fig. 6. When my improved device is used as a motor these separate wires can be connected with different sources of electricity or with the same source; when used as a dynamo, they can also be used separately or connected together. The pieces M are each at their thinner outer ends supported on both sides by pieces of iron R. The pieces M and R are bolted together at the upper ends of the pieces R; and at their lower ends the pieces R are secured to horizontal iron cross pieces S, S, which connect the supporting pieces R of both poles of the field magnet. The pieces M, R and S are all preferably made of soft iron cut or sawed into shape; in place of being forged, as I find that surfaces which have not been hardened by hammering are more susceptible and more readily magnetized and demagnetized. The pieces M may be insulated from each other or not as desired.

The different parts of the framework abutting or lying against each other are preferably first scraped and planed before being put together, in order to give good adhesion and connection and they are all made of soft homogeneous iron. The framework of the machine is completed by angle pieces T, T, secured to the outer connecting pieces S' and extending on each side thereof, to which angle pieces are secured the bearing pieces U U for the armature shaft A.

My improved field magnet, supports and framework possess many advantages over those previously known or used. The field magnets can be made out of smaller pieces of iron, can be readily cut out into shape; when fastened together the pieces M constitute a compound magnet of great power; and every part of the core is brought near to effective wire. Hence my improved field magnets are readily and easily magnetized and demagnetized and are very powerful. The shape of the portion N of the magnets tapering to the point $n$ also increases their power, while the exact opposition of the two poles to each other and the slight and gradual departure of the lower part of the curved face of N from the curve of the external face of the armature tends to bring the armature into the magnetic field and under the operation of the magnetic force gradually and smoothly, the armature moving preferably in the direction of the arrow, Fig. 1.

My improved arrangement of field magnets and of their supports and framework enables the center of gravity to be much lower than in existing machines, as the armatures and field magnets and supports are more nearly on a horizontal line. Much useless weight is thereby avoided, my device being very light in comparison with existing motors and dynamos. The character and homogeneity of the iron forming the supports and framework and the close adhesion or connection of the different parts together make a more perfect magnet of the entire structure.

What I claim as new and desire to secure by Letters Patent is;

1. An improved field magnet for electric motors or dynamos consisting of two or more pieces of iron bolted or fastened together, said pieces being hollowed out to form cores, wire wound around each of said cores and wire wound around the outside of said wire wound cores, substantially as set forth.

2. The field magnets for electric motors or dynamos, consisting of the pieces M, wound with conducting wire, the supporting pieces R, and the connecting pieces S, the supporting pieces being each secured at one end to the pieces M and at the other end to the connecting pieces S, substantially as set forth.

3. The framework and field magnets for electric motors or dynamos, consisting of the pieces M wound with conducting wire, the supporting pieces R and the connecting pieces S, the supporting pieces being each secured at one end to the pieces M and at the other end to the connecting pieces S, and the angle pieces T secured to such connecting pieces S and supporting the bearings for the armature shaft, substantially as set forth.

CORNELIUS F. DANIELS.

Witnesses:
HENRY D. WILLIAMS,
LEONARD E. WELCH, Jr.